Figure 1:
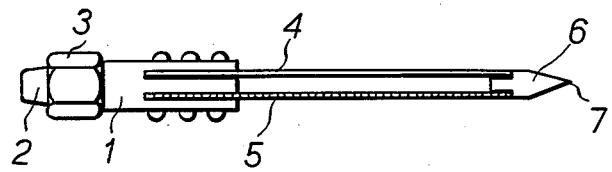

March 3, 1964  E. DALE  3,122,832
BARK PEELING DEVICES
Filed Jan. 16, 1962

INVENTOR
EDVARD DALE
BY Albert M. Parker
ATTORNEY

United States Patent Office 3,122,832
Patented Mar. 3, 1964

3,122,832
BARK PEELING DEVICES
Edvard Dale, Harestua, Norway
Filed Jan. 16, 1962, Ser. No. 166,506
1 Claim. (Cl. 30—121)

The present invention relates to a resilient reciprocable bark peeling device of the type especially adapted for operation by motor power, but the principles upon which the invention is based may with advantage also be used for manually operated devices.

It is well known that a reciprocable bark peeling device, whether driven by a motor or by manual force, ought—due to the shape of its cutting edge—include a certain angle in relation to the log to be peeled, at which angular position the peeling device operates most effectively and with a least possible consumption of energy. However, a rigid bark peeling device has certain inherent disadvantages, which have caused the adoption of devices having some form of resilience, but a drawback in all hitherto such proposed bark peeling devices provided with resilient edge or cutting blade, is that when the cutting edge springs or feathers backwards, the edge alters its operative position or angle in relation to the log. This causes a higher consumption of driving energy for the operation of the peeling device.

The present invention aims at eliminating these drawbacks by providing a bark peeling device in which the cutting blade or edge means is resiliently mounted in relation to its handle, and resiliently in such manner that the edge or cutting organ retains its most advantageous position in relation to the log, as long as the operator of the bark peeling device keeps the handle in the same angular position, a manner of operation which a worker will usually use, whether he is using motor driven or manually driven appliances.

In accordance with the invention this is obtained thereby that the cutting blade, knife or edge is so connected to the handle, that the cutting blade, during resilient movement, is staggered or parallel-displaced in relation to the handle.

In a suitable embodiment of the invention the cutting blade or edge is secured between two resilient plates, which extend in parallel relationship backwards from the edge, and which are secured in the handle at their rear ends.

In such an arrangement the cutting edge may spring back due to the resilience or elasticity of the plates, and during its movement away from the axis of the handle said edge or cutting blade will retain the same angle in relation to the log under treatment, irrespective of the springing or feathering away of the cutting blade for some reason. The cutting blade thus operates at a most advantageous cutting angle, irrespective of whether the cutting blade feathers or springs away, as long as the debarking operation takes place with the handle in correct position.

Thus the invention relates to an improvement in bark peeling devices, preferably devices driven by motors, and is substantially characterized by the fact that the cutting edge or blade of the device is so connected with the cooperating handle, that said edge may be parallel-displaced or moved in relation to said handle.

In a preferred embodiment of the invention spring elements maintain the cutting edge in alignment with the axis of the handle.

A further characterizing feature of the invention consists in the use of two resilient parallel plates secured to the handle, such plates being so spaced that the peeling knife or edge may be attached between the resilient plates at those ends of the plates remote from the handle.

If desired, and in accordance with the invention, at least one of the plates may be of rectangular formation and be provided with saw-teeth along one or both side edges thereof.

Other features and details of the invention are disclosed in the following description, with reference to the drawing.

Figure 2:
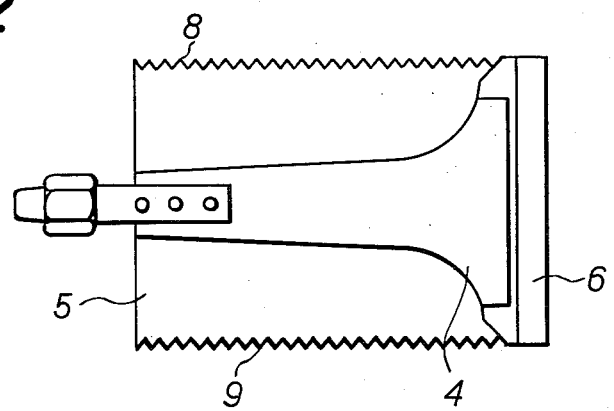
Figure 3:
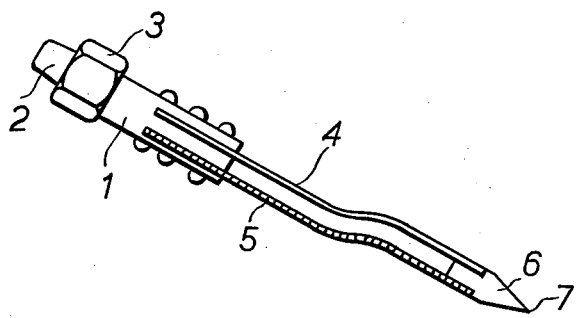

FIG. 1 is a side view of an embodiment, adapted for driving by means of a motor;
FIG. 2 is a top view of the same, and
FIG. 3 shows the device as seen from one side thereof, but with the cutting organ resiliently displaced sidewards.

In the embodiment shown on the drawing the device comprises a shank or handle 1, which by means of a suitable coupling member 2 and a nut 3 may be attached to a motor-driven machine whereby handle 1 is reciprocated in the direction of its length. In the embodiment shown the handle 1 has a preferably circular cross section and is provided with two slots, which receive the end portions of two lamellar springs 4 and 5 respectively. Between the outer ends of said springs 4 and 5 is placed a chisel-like cutting blade proper 6, which has an edge 7, and handle 1, springs 4, 5 and cutting blade 6 are interconnected by means of rivets or other conventional means, not shown. The distance between the slots in the handle 1 corresponds to the thickness of the cutting blade 6 at the place where the spring plates 4, 5 are secured, so that the spring plates are arranged parallel to each other.

In the embodiment here chosen by way of example the spring plate 4 has the shape shown in FIG. 2, and the spring plate 5 is rectangular and is provided with saw teeth 8, 9 along its side edges, for the cutting of smaller limbs when the device is reciprocated in operation, e.g. by a motorized driven bark peeling machine. FIGURE 3 illustrates how the resilient sidewise displacement of blade 6 takes place, there it is seen that since the resilient plates 4 and 5 are parallel they will be parallel-displaced in such a manner that the angle between the cutting blade and the work—which in most cases is a log—is not altered, irrespective of how large or how little the transverse distance through which cutting blade 6 is deflected.

Thus the invention provides a bark peeling device which has the advantages of a fully rigid bark peeling device, which at all times retains the full operation angle, and which combines therewith the advantages of a bark peeling device in which the cutting organ is resiliently mounted, all without any of the drawbacks of the previously known types of bark peeling devices.

The described example only serves to illustrate the invention and does not limit the same. Other embodiments are well conceivable; e.g. the handle may be provided with a sleeve-formed member for attachment of the bark peeling device to a suitably long handle of wood, or the like, if it is wished to make use of the invention also in connection with manually operated bark peeling devices.

I claim:

In a bark peeling device having a motor, a reciprocable tool-mounting member driven by the motor, and a chisel-like bark peeling tool mounted on the tool-mounting member and reciprocably driven thereby, the improved bark peeling tool which comprises a shank, means on the shank adapted to secure it to the tool-mounting member for reciprocation with such member in the direction of the length of the shank, two spaced stiff but resilient plates parallel throughout their lengths and rigidly secured at their rear ends to the shank and extending forwardly for a substantial distance substantially in alignment with the axis of the shank, and a chisel-like cutting blade rigidly secured between the forward ends of the plates, said cutting blade have a forwardly facing cutting edge disposed substantially transversely to the axis of the shank and in a plane substantially parallel to the broad extents of the plates, whereby the blade may be displaced in a direction generally normal to the broad extents of the plates by resilient bending of the plates during operation of the tool without changing the cutting angle of the blade.

References Cited in the file of this patent

UNITED STATES PATENTS

| | | |
|---|---|---|
| 875,391 | Tinsley | Dec. 31, 1907 |
| 1,339,397 | Jones | May 11, 1920 |
| 2,326,502 | Sieg | Aug. 10, 1943 |
| 2,660,785 | Shaler | Dec. 1, 1953 |

FOREIGN PATENTS

| | | |
|---|---|---|
| 126,767 | Germany | Jan. 9, 1902 |
| 183,150 | Austria | Sept. 10, 1955 |